US012611953B2

(12) United States Patent
Messina et al.

(10) Patent No.: US 12,611,953 B2
(45) Date of Patent: Apr. 28, 2026

(54) DELIVERY TRUCK WITH CHARGE CAPABILITY

(71) Applicant: Oshkosh Corporation, Oshkosh, WI (US)

(72) Inventors: Robert Messina, Oshkosh, WI (US); Shashank Bhatia, Oshkosh, WI (US); Ignacy Puszkiewicz, Oshkosh, WI (US); Mike Buhidar, Oshkosh, WI (US); David Lombardo, Oshkosh, WI (US); Peter Gilbert, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 493 days.

(21) Appl. No.: 18/158,257

(22) Filed: Jan. 23, 2023

(65) Prior Publication Data

US 2023/0256849 A1 Aug. 17, 2023

Related U.S. Application Data

(60) Provisional application No. 63/302,189, filed on Jan. 24, 2022.

(51) Int. Cl.
B60L 53/12 (2019.01)
B60L 50/60 (2019.01)
(Continued)

(52) U.S. Cl.
CPC .............. B60L 53/57 (2019.02); B60L 50/61 (2019.02); B60L 50/66 (2019.02); B60L 53/12 (2019.02); B60P 3/06 (2013.01); B60K 6/46 (2013.01); B60L 2200/28 (2013.01); B60L 2200/40 (2013.01); B60P 7/08 (2013.01); B60Y 2200/148 (2013.01); B60Y 2200/92 (2013.01)

(58) Field of Classification Search
CPC .......... B60L 53/57; B60L 50/61; B60L 53/12; B60L 50/66; B60L 2200/28; B60L 2200/40; B60K 6/146; B60P 3/06; B60P 7/08
USPC ...................................................... 180/65.31
See application file for complete search history.

(56) References Cited

U.S. PATENT DOCUMENTS

| | | | | |
|---|---|---|---|---|
| 11,685,276 B2 * | 6/2023 | Macaluso | ............... | F16D 41/00 |
| | | | | 180/165 |
| 11,912,144 B2 * | 2/2024 | Wheatley | ................ | B60L 53/52 |
| (Continued) | | | | |

FOREIGN PATENT DOCUMENTS

| | | |
|---|---|---|
| DE | 10 2010 010 119 A1 | 9/2011 |
| DE | 10 2015 008 829 A1 | 1/2016 |
| (Continued) | | |

OTHER PUBLICATIONS

International Search Report and Written Opinion issued in connection with WO Appl. Ser. No. PCT/US2023/011345 dated May 2, 2023.

*Primary Examiner* — Hau V Phan
(74) *Attorney, Agent, or Firm* — FOLEY & LARDNER LLP

(57) ABSTRACT

A delivery truck for transporting a vehicle includes a chassis, a tractive element coupled to the chassis, a prime mover configured to drive the tractive element to propel the delivery truck, a bed coupled to the chassis and configured to support the vehicle, and a wireless charging interface coupled to the bed and configured to wirelessly transfer energy to the vehicle.

12 Claims, 5 Drawing Sheets

(51) Int. Cl.
  *B60L 50/61*    (2019.01)
  *B60L 53/57*    (2019.01)
  *B60P 3/06*     (2006.01)
  *B60P 7/08*     (2006.01)
  *B60K 6/46*     (2007.10)

(56)     References Cited

U.S. PATENT DOCUMENTS

| | | | |
|---|---|---|---|
| 2012/0119698 A1* | 5/2012 | Karalis | H02J 50/10 |
| | | | 320/108 |
| 2012/0153732 A1* | 6/2012 | Kurs | H04B 5/79 |
| | | | 307/104 |
| 2012/0228953 A1* | 9/2012 | Kesler | B60L 53/126 |
| | | | 307/104 |
| 2012/0256494 A1* | 10/2012 | Kesler | H02J 50/40 |
| | | | 307/104 |
| 2013/0002198 A1* | 1/2013 | Mccluskey | H02J 7/342 |
| | | | 320/109 |
| 2015/0033962 A1 | 2/2015 | Schwartz et al. | |
| 2015/0159564 A1 | 6/2015 | Wildgrube et al. | |
| 2015/0175353 A1 | 6/2015 | Gillmore et al. | |
| 2015/0364944 A1* | 12/2015 | Garcia Briz | H02J 50/60 |
| | | | 307/104 |
| 2017/0253221 A1 | 9/2017 | Verhoff et al. | |
| 2017/0291802 A1 | 10/2017 | Hao et al. | |
| 2017/0291805 A1 | 10/2017 | Hao et al. | |
| 2017/0297425 A1 | 10/2017 | Wildgrube et al. | |
| 2018/0162704 A1 | 6/2018 | Hao et al. | |
| 2018/0354383 A1* | 12/2018 | Namou | B60L 53/124 |
| 2019/0071291 A1 | 3/2019 | Puszkiewicz et al. | |
| 2019/0119088 A1 | 4/2019 | Puszkiewicz et al. | |
| 2019/0121353 A1 | 4/2019 | Datema et al. | |
| 2019/0185077 A1 | 6/2019 | Smith et al. | |
| 2019/0185301 A1 | 6/2019 | Hao et al. | |
| 2019/0322321 A1 | 10/2019 | Schwartz et al. | |
| 2019/0322512 A1 | 10/2019 | Puszkiewicz et al. | |
| 2019/0351883 A1 | 11/2019 | Verhoff et al. | |
| 2019/0352157 A1 | 11/2019 | Hao et al. | |
| 2020/0031641 A1 | 1/2020 | Puszkiewicz et al. | |
| 2020/0094671 A1 | 3/2020 | Wildgrube et al. | |
| 2020/0140248 A1 | 5/2020 | Hackenberg et al. | |
| 2020/0316816 A1 | 10/2020 | Messina et al. | |
| 2020/0317065 A1 | 10/2020 | Lombardo | |
| 2020/0317083 A1* | 10/2020 | Messina | B60P 3/16 |
| 2020/0317480 A1 | 10/2020 | Shankar et al. | |
| 2020/0317486 A1 | 10/2020 | Puszkiewicz et al. | |
| 2020/0317488 A1 | 10/2020 | Bafile et al. | |
| 2020/0317489 A1 | 10/2020 | Bhatia et al. | |
| 2020/0317491 A1 | 10/2020 | Bafile et al. | |
| 2020/0317492 A1 | 10/2020 | Bhatia et al. | |
| 2020/0317493 A1 | 10/2020 | Lombardo et al. | |
| 2020/0346547 A1 | 11/2020 | Rocholl et al. | |
| 2021/0002112 A1 | 1/2021 | Puszkiewicz et al. | |
| 2021/0031611 A1 | 2/2021 | Yakes et al. | |
| 2021/0031612 A1 | 2/2021 | Yakes et al. | |
| 2021/0031649 A1 | 2/2021 | Messina et al. | |
| 2021/0039935 A1 | 2/2021 | Hackenberg et al. | |
| 2021/0124347 A1 | 4/2021 | Datema et al. | |
| 2021/0155463 A1 | 5/2021 | Hao et al. | |
| 2021/0221216 A1 | 7/2021 | Yakes et al. | |
| 2021/0229755 A1 | 7/2021 | Schwartz et al. | |
| 2021/0252969 A1 | 8/2021 | Wildgrube et al. | |
| 2021/0276423 A1 | 9/2021 | Lombardo et al. | |
| 2021/0276848 A1 | 9/2021 | Miller et al. | |
| 2021/0276850 A1 | 9/2021 | Lombardo et al. | |
| 2021/0279991 A1 | 9/2021 | Shankar et al. | |
| 2021/0316625 A1* | 10/2021 | Oetken | B60L 53/30 |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0325529 A1 | 10/2021 | Koga et al. | |
| 2021/0325911 A1 | 10/2021 | Koga et al. | |
| 2021/0327164 A1 | 10/2021 | Koga et al. | |
| 2021/0345062 A1 | 11/2021 | Koga et al. | |
| 2021/0362696 A1 | 11/2021 | Verhoff et al. | |
| 2021/0362697 A1 | 11/2021 | Verhoff et al. | |
| 2021/0370893 A1 | 12/2021 | Verhoff et al. | |
| 2021/0370894 A1 | 12/2021 | Verhoff et al. | |
| 2021/0373560 A1 | 12/2021 | Koga et al. | |
| 2021/0380085 A1 | 12/2021 | Verhoff et al. | |
| 2021/0380179 A1 | 12/2021 | Smith et al. | |
| 2021/0395058 A1 | 12/2021 | Hao et al. | |
| 2022/0009338 A1 | 1/2022 | Yakes et al. | |
| 2022/0033181 A1 | 2/2022 | Koga et al. | |
| 2022/0097527 A1 | 3/2022 | Koga et al. | |
| 2022/0097961 A1 | 3/2022 | Koga et al. | |
| 2022/0097964 A1 | 3/2022 | Koga et al. | |
| 2022/0135385 A1 | 5/2022 | Lombardo et al. | |
| 2022/0144226 A1 | 5/2022 | Verhoff et al. | |
| 2022/0144227 A1 | 5/2022 | Verhoff et al. | |
| 2022/0176921 A1 | 6/2022 | Verhoff et al. | |
| 2022/0185582 A1 | 6/2022 | Koga et al. | |
| 2022/0185643 A1 | 6/2022 | Messina et al. | |
| 2022/0194333 A1 | 6/2022 | Verhoff et al. | |
| 2022/0194334 A1 | 6/2022 | Verhoff et al. | |
| 2022/0234554 A1 | 7/2022 | Verhoff et al. | |
| 2022/0234555 A1 | 7/2022 | Verhoff et al. | |
| 2022/0234873 A1 | 7/2022 | Miller et al. | |
| 2022/0289152 A1 | 9/2022 | Verhoff et al. | |
| 2022/0332556 A1 | 10/2022 | Kobel et al. | |
| 2022/0348090 A1 | 11/2022 | Lombardo | |
| 2022/0371864 A1 | 11/2022 | Shankar et al. | |
| 2023/0002152 A1 | 1/2023 | Koga et al. | |
| 2023/0049763 A1 | 2/2023 | Messina et al. | |
| 2023/0089417 A1 | 3/2023 | Koga et al. | |
| 2023/0092520 A1 | 3/2023 | Verhoff et al. | |

FOREIGN PATENT DOCUMENTS

| | | | |
|---|---|---|---|
| DE | 10 2016 003 532 A1 | 11/2016 | |
| DE | 10 2018 207 768 A1 | 11/2019 | |
| EP | 2 572 922 A1 | 3/2013 | |
| EP | 2 927 045 A1 | 10/2015 | |
| EP | 3 587 166 A1 | 1/2020 | |
| EP | 3 650 264 B1 | 5/2020 | |
| FR | 2982560 A1 | 5/2013 | |
| WO | WO-2018/076852 A1 | 5/2018 | |

\* cited by examiner

DELIVERY TRUCK WITH CHARGE CAPABILITY

CROSS-REFERENCE TO RELATED PATENT APPLICATION

This application claims the benefit of and priority to U.S. Provisional Application No. 63/302,189, filed on Jan. 24, 2022, the entire disclosure of which is hereby incorporated by reference herein.

BACKGROUND

Aerial work platforms (AWPs) and mobile elevating work platforms (MEWPs) are increasingly transitioning to semi-electric or all electric configurations. To support the increasing electrification of these AWPs and MEWPs, the vehicles are equipped with one or more charge storing devices, such as batteries. Because the capacity of charge storing devices is limited, recharging is frequently needed.

SUMMARY

At least one embodiment relates to a delivery truck for transporting a vehicle. The delivery truck includes a chassis, a tractive element coupled to the chassis, a prime mover configured to drive the tractive element to propel the delivery truck, a bed coupled to the chassis and configured to support the vehicle, and a wireless charging interface coupled to the bed and configured to wirelessly transfer energy to the vehicle.

Another embodiment relates to a delivery vehicle for transporting a piece of equipment. The delivery vehicle includes a chassis, a tractive element coupled to the chassis, a prime mover configured to drive the tractive element to propel the delivery vehicle, a support defining a support surface configured to support the piece of equipment, a battery coupled to the chassis, and a wireless charging interface coupled to the support and configured to wirelessly transfer energy from the battery to the piece of equipment.

Another embodiment relates to a method of delivering a vehicle to a jobsite. The method includes loading the vehicle onto a bed of a delivery truck, securing the vehicle onto the bed in a position in which a first wireless charging interface of the delivery truck is in communication with a second wireless charging interface of the vehicle, and transferring energy from a first battery of the delivery truck to a second battery of the vehicle through the first wireless charging interface and the second wireless charging interface.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various exemplary embodiments disclosed herein relate to systems, apparatuses, and methods for charging a lift device, such as an AWP or MEWP. The system for charging a lift generally includes a delivery truck. The delivery truck includes a chassis, a first series of tractive elements coupled to the chassis, a motor coupled to the chassis, a bed coupled to the chassis, a second series of tractive elements coupled to the bed, an electrical cabinet coupled to the bed, a battery assembly coupled to the bed, and a charging pad coupled to the bed.

The charging pad includes an induction coil (e.g., a copper coil, etc.) that is configured to receive current from an electrical power source, such as a utility source (e.g., from a wall socket, etc.), generator, or battery assembly. When the induction coil is powered, current is supplied from the electrical power source to the induction coil, which creates a magnetic field. The magnetic field extends upwardly and outwardly from the bed, such that a lift or other equipment positioned on the bed can interact with the generated magnetic field. If the lift or other equipment includes an antenna loop (e.g., a copper coil) in communication with its battery or battery assembly, a current will be generated within the antenna loop when the antenna loop is positioned within the magnetic field generated by the induction coil. The current within the antenna loop can then be supplied to the battery or battery assembly within the lift or other equipment to charge the battery or battery assembly without the need for a wired connection. The lift or other equipment may achieve a sufficient charge level while positioned on the bed, whether for transport or for stationary purposes. After a sufficient charge level is achieved, the lift or other equipment can drive away from or otherwise be removed from the bed.

Figure 1:
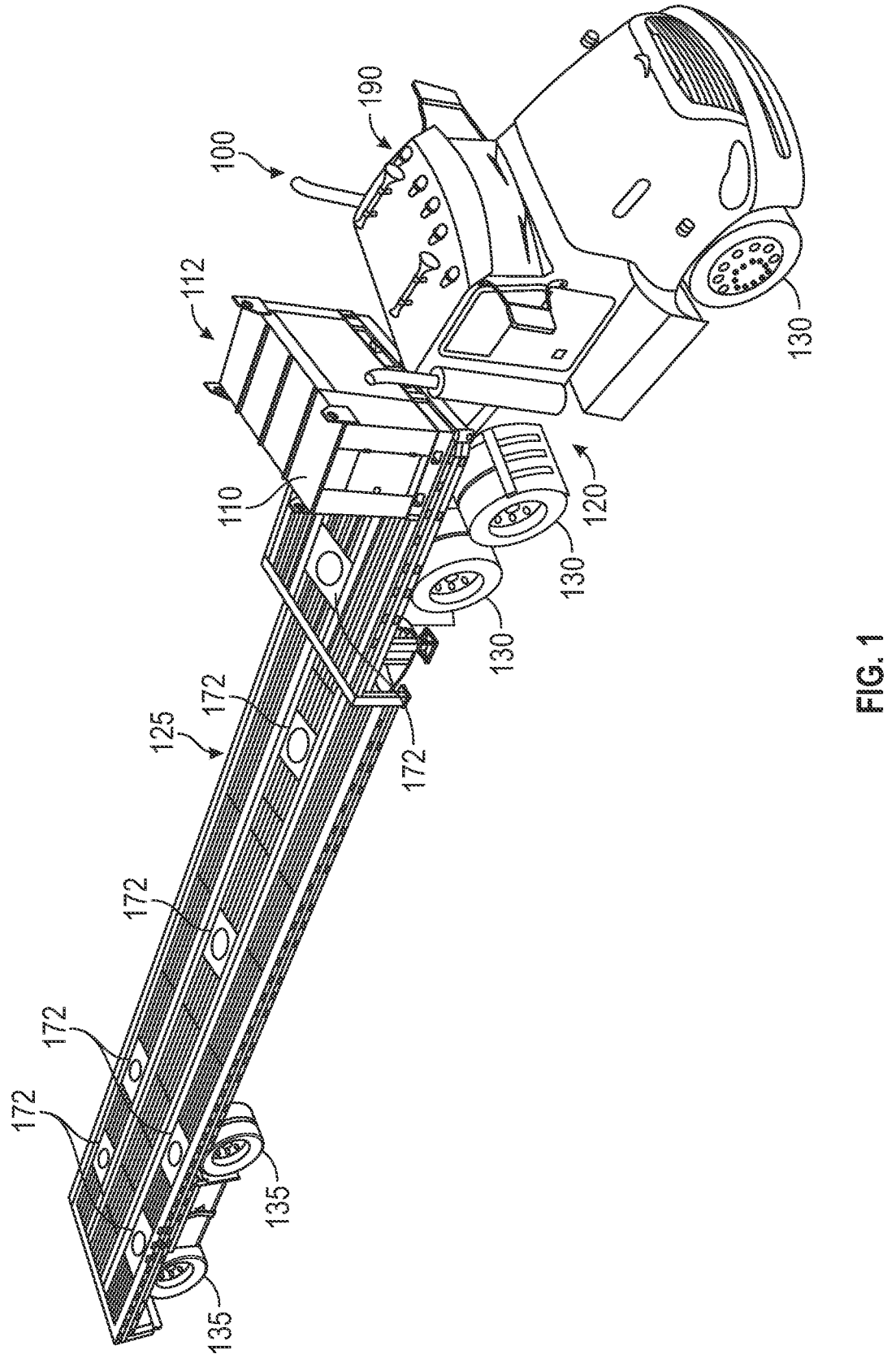
FIG. 1 is a perspective view of a delivery truck, according to an exemplary embodiment.

Referring now to FIG. 1, a delivery truck 100 is depicted. The delivery truck 100 generally includes a cabin 190 (e.g., a front cab), a chassis 120 (e.g., a frame), a first series of tractive elements 130 coupled to the chassis 120, a bed 125 (e.g., a truck bed, a flatbed, etc.) coupled to the chassis, a second series of tractive elements 135 coupled to the bed 125, an electrical cabinet 110 coupled to the bed 125, a battery assembly 112 coupled to the bed 125, and a charging pad 172 (e.g., a wireless charging interface) coupled to the bed 125.

Figure 5:
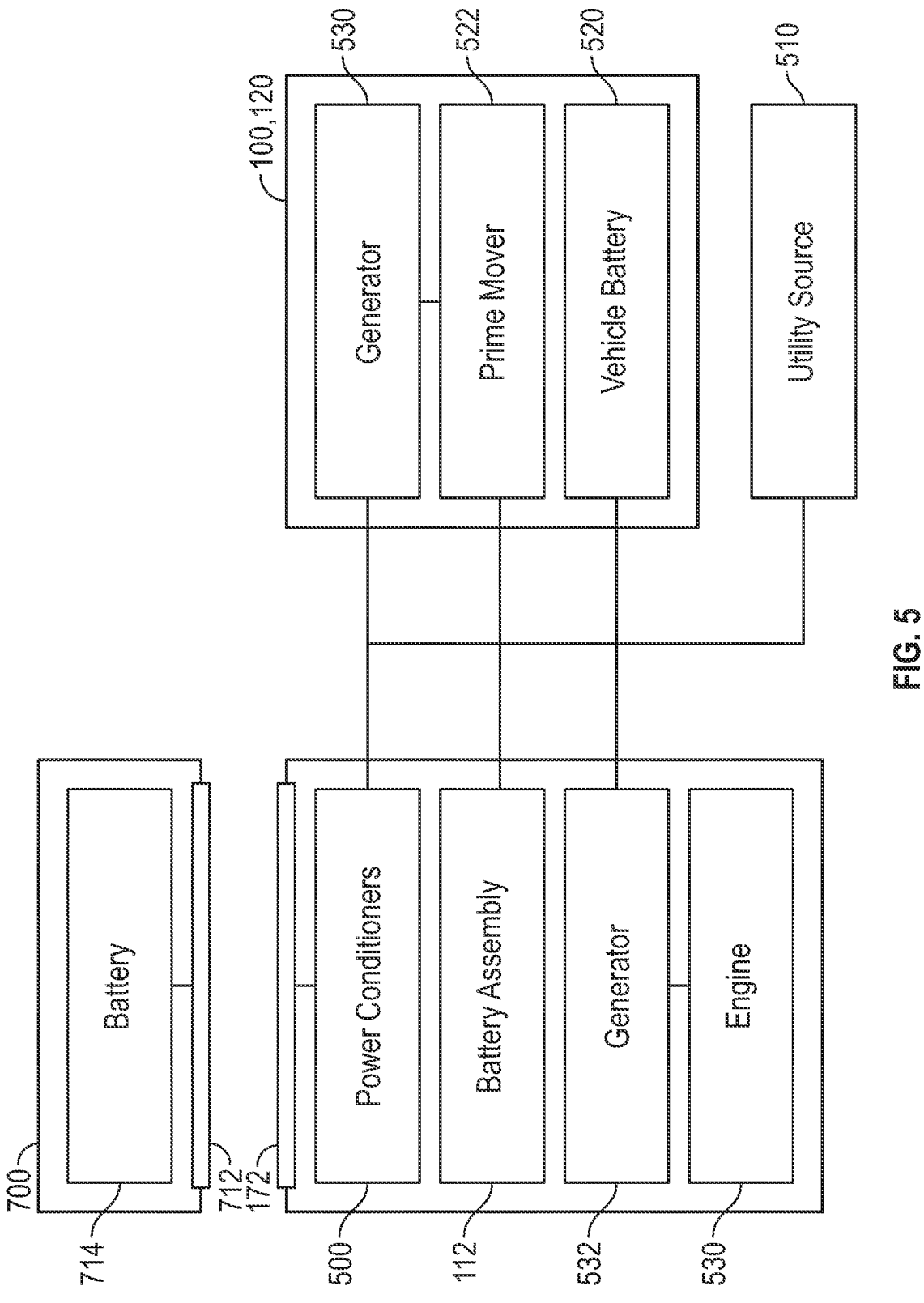
FIG. 5 is a block diagram of the delivery truck of FIG. 1 and the lift device of FIG. 3.

In some embodiments, the electrical cabinet 110 can support a variety of different electrical components (e.g., the power conditioners 500 shown in FIG. 5), including transformers that are configured to step down and/or step up voltage received from a secondary source. In some examples, the electrical cabinet 110 also receives one or more inverters. The inverters are configured to transition direct current electricity stored within one or more batteries included in the battery assembly 112 into alternating current electricity for use by the charging pad 172, as discussed below. The electrical cabinet 110 may be coupled to a display positioned within the cabin 190 to communicate data regarding the battery life of the battery assembly 112.

In some embodiments, the electrical cabinet 110 stores or is coupled to an electrical power source. For example, in some embodiments, the electrical cabinet 100 is placed in communication with a utility source (e.g., a power grid, the utility source 510 shown in FIG. 5). The utility source can supply standard utility alternating current electrical power at 120 V and 60 Hz, for example. In other embodiments, the electrical cabinet 110 is placed in communication with a 240 V or 480 V power source instead. In some embodiments, the electrical cabinet 110 is placed in communication with one or more batteries (e.g., the vehicle battery 520 shown in FIG. 5) powering a motor (e.g., the prime mover 522 shown in FIG. 5) included in the delivery truck 100. Additionally or alternatively, the electrical cabinet 110 can support one or more batteries included in the battery assembly 112. In some examples, a plurality of rechargeable batteries are included in the battery assembly 112 (e.g., lithium-ion, nickel-cadmium, lead-acid, etc.) and are received within the electrical cabinet 110. The battery assembly 112 is configured to receive electricity from the utility source through the inverter, which converts the AC utility source power into DC power which can be stored within the battery. The battery assembly 112 may also be charged from other equipment engaged with the charging pad 172. In other embodiments, the electrical cabinet 110 houses an internal combustion engine (e.g., the engine 530 shown in FIG. 5) and a generator (e.g., the generator 532 shown in FIG. 5) that are configured to produce and supply power as a secondary power source.

In some embodiments, the battery assembly 112 can be charged from one or more batteries (e.g., the vehicle battery 520 shown in FIG. 5) powering the motor (e.g., the prime mover 522 shown in FIG. 5) of the delivery truck 100. In other embodiments, the delivery truck 100 further includes additional batteries (e.g., the vehicle battery 520 shown in FIG. 5) integrated into the delivery truck 100 for the purpose of recharging the battery assembly 112. In other embodiments still, the delivery truck 100 includes a generator (e.g., the generator 530 shown in FIG. 5) powered by the engine (e.g., the prime mover 522 shown in FIG. 5) of the delivery truck 100 and the generator is configured to charge the battery assembly 112. The generator may use a retarder type function to increase efficiency. In some embodiments, the delivery truck 100 is configured to facilitate charging between the lift device 710 and a power source external to the delivery truck 100 entirely. For example, the delivery truck 100 may further include a direct charging interface that bypasses the battery and couples an external power source (e.g., the utility source 510 shown in FIG. 5) that charges batteries of the lift device 710.

In some embodiments, the delivery truck 100 may keep the battery assembly 112 warm and conditioned (e.g., within a desired temperature range, above a low temperature limit or threshold, below a high temperature limit or threshold, by charging the battery assembly 112, etc.) during transport. Moreover, the delivery truck 100 may keep the battery assembly 112 warm and conditioned while waiting at a job site. For example, the delivery truck 100 may park at a location overnight to be available on a job site as soon as possible.

In some embodiments, the electrical cabinet 110 is electrically coupled to the charging pad 172 and is configured to supply electrical current (e.g., electrical energy) to the charging pad 172. Electrical current is provided from the electrical cabinet 110 to the charging pad 172 by one or more of the power sources in communication with the electrical cabinet 110. In some examples, a wired connection of one or more cables and/or a plug is formed between the electrical cabinet 110 and the charging pad 172 so that electrical current can be efficiently transmitted between the electrical cabinet 110 and the charging pad 172. The electrical power transmitted from the electrical cabinet 110 can be preconditioned (e.g., by the power conditioners 500) depending on the electrical supply source. For example, electrical power supplied to the charging pad 172 by the utility source can be passed through a transformer before being supplied to the charging pad 172. Alternatively, electrical power provided from the battery assembly 112 can be passed to an inverter before being supplied to the charging pad 172, such that alternating current is always provided to the charging pad 172.

Figure 2:
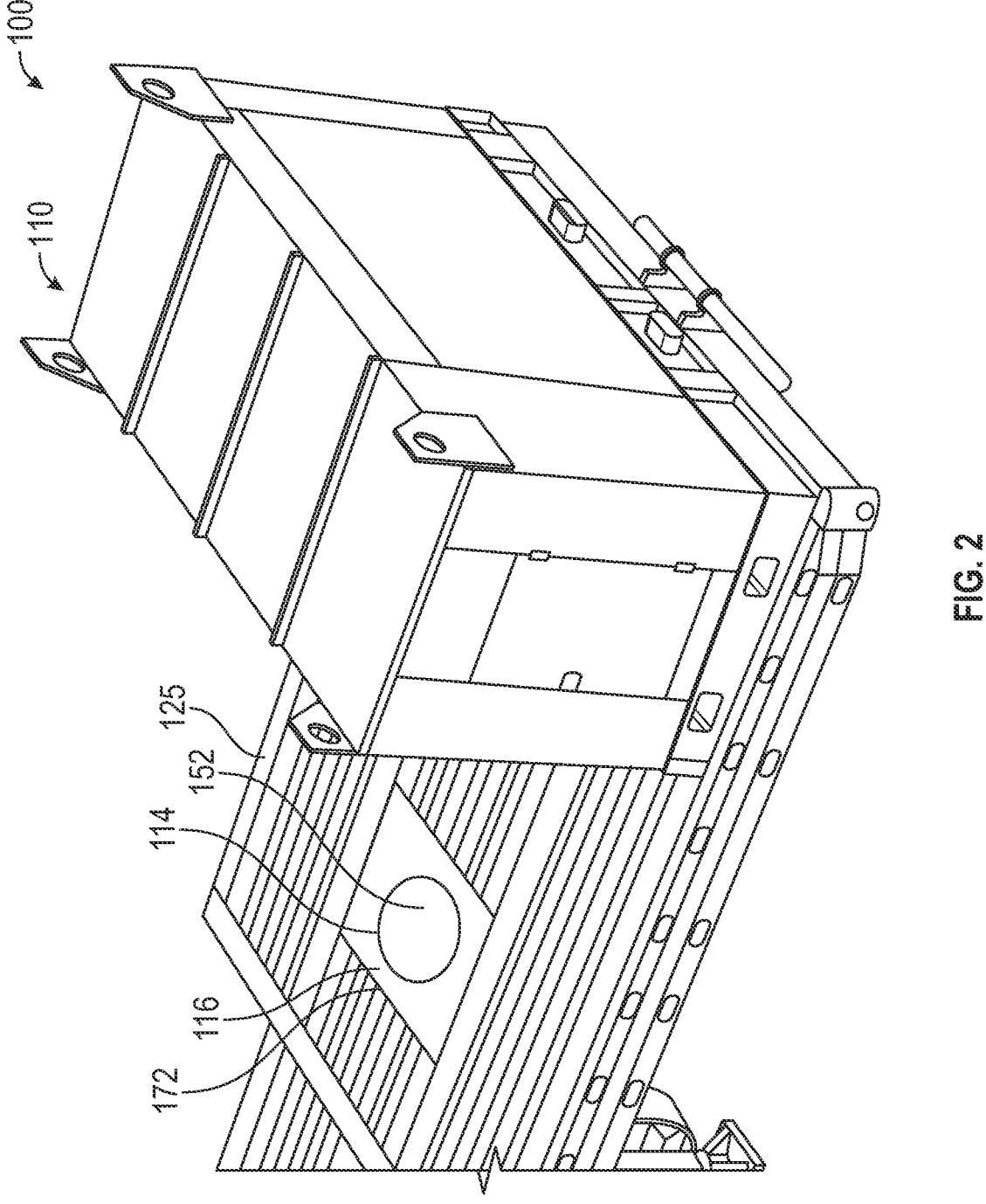
FIG. 2 is a perspective view a charging pad of the delivery truck of FIG. 1.

Referring now to FIG. 2, a perspective view of the charging pad 172 of the delivery truck 100 depicted in FIG. 1 is shown, according to one embodiment. Electrical current received by the charging pad 172 is routed to an induction coil 114 received within the charging pad 172. The induction coil 114 can be formed of copper, for example, and includes one or more turns (e.g., coils or loops). When current is provided to the induction coil 114, the current travels around the wire structure in a circular manner. Movement of the current through the induction coil 114 creates a magnetic field that extends vertically upward, through the upper surface 152 of the charging pad 172 and above the charging pad 172, generally. The magnetic field generated by the induction coil 114 can then be used to generate electrical energy and wirelessly charge lifts and other equipment positioned within the magnetic field.

In some embodiments, the induction coil 114 is positioned within a charging area 116 formed within the charging pad 172. As depicted in FIG. 1, the charging area 116 can be visually marked on the charging pad 172 (e.g., with different coloration, etc.) so that an operator of a lift device or other vehicle can easily identify the location in which the induction coil 114 is positioned. In some examples, the charging area 116 is centrally located within the charging pad 172. In other examples, the charging area 116 is offset to one side of the charging pad 172.

Figure 3:
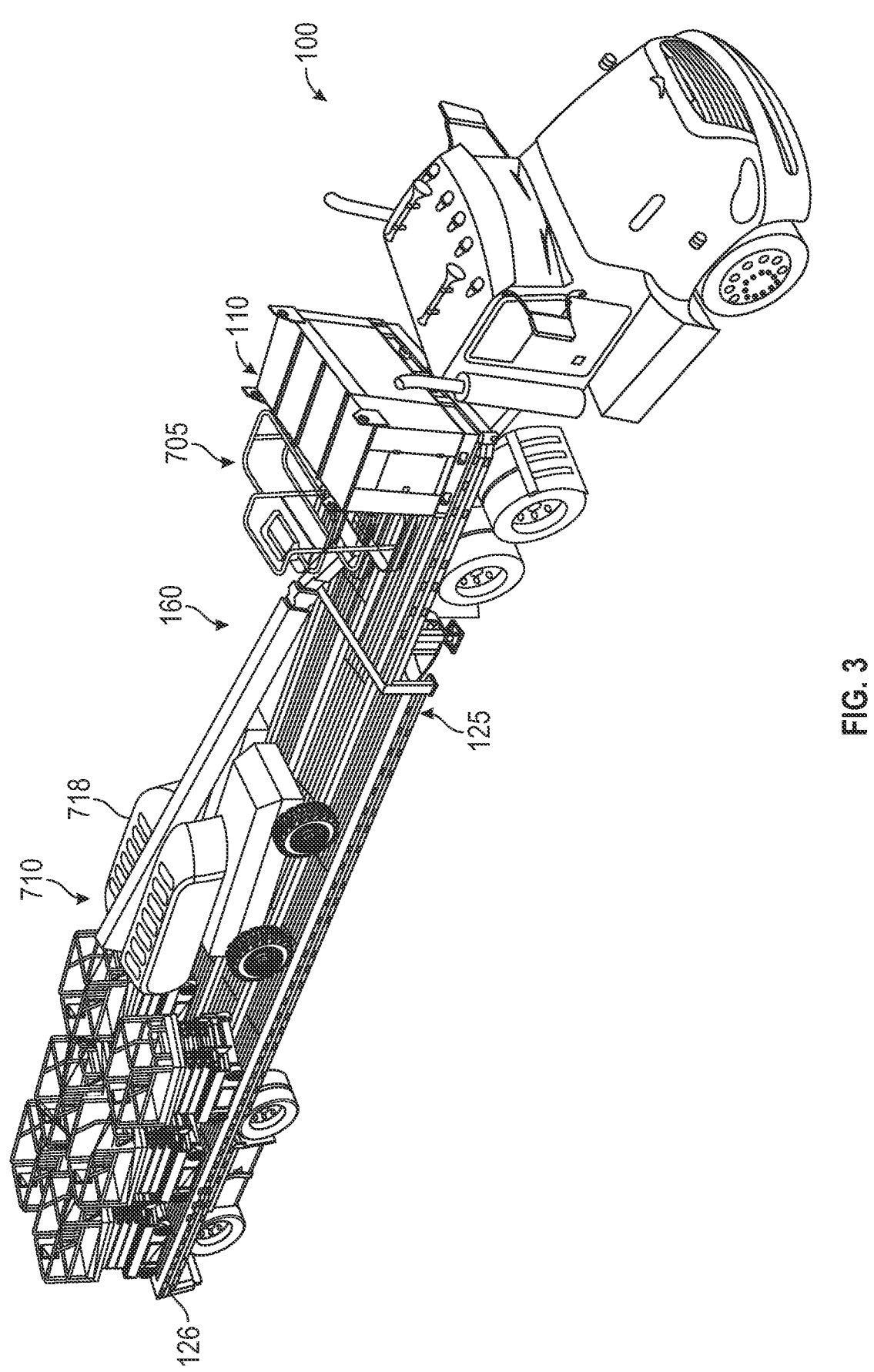
FIG. 3 is a perspective view of the delivery truck of FIG. 1 supporting a series of lift devices, according to an exemplary embodiment.

Referring now to FIG. 3, a process for wirelessly charging a lift device 710 using a delivery truck, such as the delivery truck 100 depicted in FIG. 1, is shown according to one embodiment. Although shown as telescopic boom lift, the lift device 710 can each be a variety of different lift devices, including a scissor lift, telehandler, electric scissor lift, forklift, or other suitable devices that include one or more battery-operated or electrical components. In other embodiments, the charging system 100 performs the charging process with another type of vehicle or work equipment (e.g., a refuse vehicle, a concrete mixer truck, a towtruck, a passenger vehicle, a military vehicle, etc.).

In some embodiments, the delivery truck 100 uses one or more actuators to tilt the bed 125 backwards in order to receive the lift device 710. For example, the bed 125 may tilt backwards about an axis parallel to the ground until a back end 126 of the bed 125 is low enough for the lift device 710 to drive onto the bed 125 and engage the charging pad 172. In other embodiments, a separate ramp is positioned in between the lift device 710 and the back end 126 of the bed

125, thereby allowing the lift device 710 to drive onto the bed 125 and engage the charging pad 172. In other embodiments still, the lift device 710 may engage the charging pad 172 without driving onto the bed 125 at all, as described in more detail below.

In some embodiments, the bed 125 may include a rigid frame extending upward in order to protect a lift device during transport.

In some embodiments, the delivery truck 100 charges the lift device 710 while driving to transport the truck to and from a job site. In other embodiments, the delivery truck 100 remains stationary while the lift device 710 is charging (e.g., waiting in a stationary location to transport the lift device 710 to a job site). In this way, a battery-powered lift device may arrive at a job site with warm and conditioned batteries, rather than arriving at a job site with cold and unconditioned batteries that discharged during transport. Without charging occurring during transport, as described herein, batteries on a lift device may lose their charge during transport and not perform properly upon arrival. For example, batteries of a lift may be sensitive to temperature fluctuations that occur while waiting to arrive at a job site. Advantageously, the delivery truck 100 is configured to provide the lift device 710 to a job site with warm and conditioned batteries regardless of the transportation circumstances.

Figure 4:
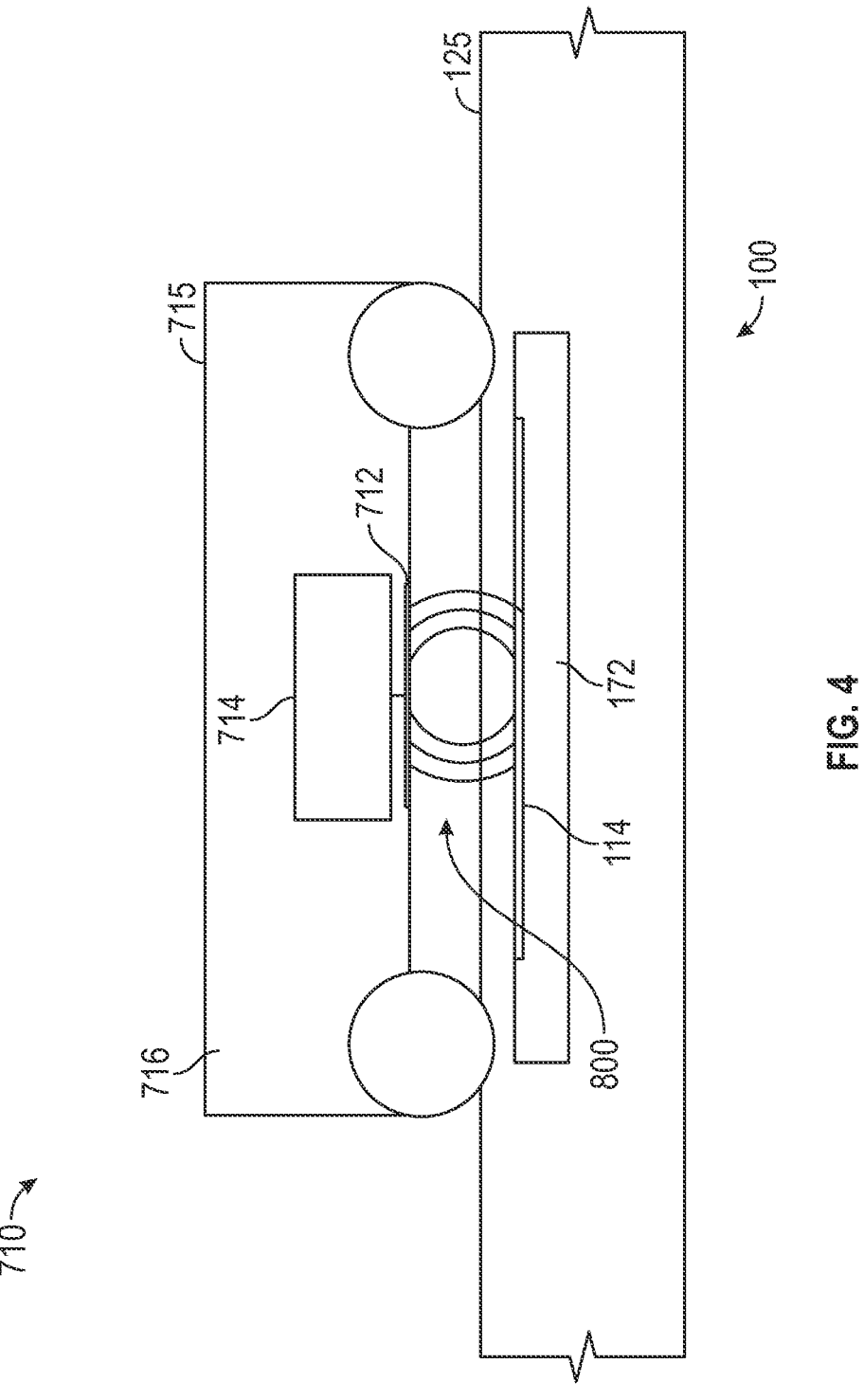
FIG. 4 is a schematic view of one of the lift devices of FIG. 3 in communication with the charging pad of FIG. 2.

Referring now to FIG. 4, a process for wirelessly charging a lift device, such as the lift device 710 depicted in FIG. 3, is shown according to one embodiment. The wireless charging process generally includes a service vehicle, such as the delivery truck 100 depicted in FIG. 1, interacting with the lift device 710 as depicted in FIG. 4, to discharge an electric charge through the charging pad 172 of the delivery truck 100. To interact with the delivery truck 100, the lift device 710 includes an antenna coil 712 (e.g., a wireless charging interface) that is electrically coupled with the battery 714 of the lift device 710. The antenna coil 712, like the induction coil 114 depicted in FIG. 2, is formed of copper wire that includes a series of turns. When the antenna coil 712 is positioned within a magnetic field, a current in generated within the antenna coil 712 that can then be provided to the battery 714 to help charge the battery 714. To better position the antenna coil 712 within magnetic fields (e.g., such as the magnetic field created by the induction coil 114), the antenna coil 712 is positioned at or near a base of a chassis 716 of the lift device 710. Accordingly, the antenna coil 712 may be positioned at or near an absolute bottom of the chassis 716 of the lift device 710.

In some embodiments, the lift device 710 moves onto the bed 125 to position the antenna coil 712 directly or approximately directly above the induction coil 114 of a charging pad, such as the charging pad 172 depicted in FIG. 1, and the charging area 116 of the charging pad 172, more generally. Although shown centered above the charging area 116 and the induction coil 114, certain versions of the lift device 710 may have an antenna coil 712 offset to a different side of the lift device 710. For example, in some embodiments, the antenna coil 712 is offset to one of the corners of the chassis 716. In other embodiments, the antenna coil 712 is not located on the chassis 716, but is rather located on an implement of the lift device, such as an implement 705 included in the lift device 710 depicted in FIG. 3. The lift device 710 may therefore position the antenna coil 712 directly or approximately directly above the induction coil 114 without driving the chassis 716 onto the bed 125, but rather manipulating a boom (e.g., a lift assembly), such as a boom 160 included in the lift device 710, to position the implement 705. In some embodiments, the lift device 710 includes an indicator 715 (e.g., a light) on the chassis 716 or a lift device housing, such as a lift device housing 718 depicted in FIG. 3, that illuminates when the antenna coil 712 is positioned within the charging area 116 and the battery 714 is receiving power (i.e., the battery is charging).

In some embodiments, with the lift device 710 positioned so that the antenna coil 712 is above the induction coil 114 and the charging area 116, the antenna coil 712 is positioned within a magnetic field 800 created by the current passing through the induction coil 114. The antenna coil 712 within the magnetic field 800 generates a current within the antenna coil 712, which is then passed upwardly, to the battery 714 of the lift device 710 to charge the battery 714. In some examples, the indicator 715 provides a visual indication that charging is complete, or that charging has reached a threshold level.

As shown in FIGS. 1 and 3, the delivery vehicle 100 includes a grid of charging pads 172 to accommodate multiple lift devices 700 (e.g., shown as a boom lift and several scissor lifts). The charging pads 172 may be disposed within the bed 125 (e.g., embedded into the surface of the bed 125).

Although depicted as an induction coil 114, various other types of wireless charging mechanisms can be used. For example, magnetic resonance charging, electric field coupling, or radio receptioning can be used in lieu of magnetic induction. While operationally different, the structure for each different type of wireless charging mechanism described above can be considered encompassed within the term "induction coil."

Referring again to FIG. 3, when a desired charge level has been reached, an operator of the lift device 710 can drive the lift device 710 off of the bed 125, away from the delivery truck 100, and/or otherwise move the antenna coil 712 away from the induction coil 114. A new lift device may then drive onto the delivery truck 100 to complete a similar charging process.

Using the above described service vehicles and methods, a jobsite can incorporate a wireless charging unit that can help to continuously charge lift devices and other equipment, according to one embodiment. The delivery truck can create a faster and more efficient way to charge devices remotely, which helps to ensure that devices at a jobsite are operable beyond the life of a single charge of a battery. While conventional equipment is typically only able to operate for as long as a single charge of a battery lasts, the service vehicle disclosed herein permits for extended use of equipment.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the delivery truck 100 as shown in the various exemplary embodiments is illustrative only. Additionally, any element disclosed in one embodiment may be incorporated or utilized with any other embodiment disclosed herein.

What is claimed is:

1. A delivery vehicle for transporting a piece of equipment, the delivery vehicle comprising:
   a chassis;
   a tractive element coupled to the chassis;
   a prime mover configured to drive the tractive element to propel the delivery vehicle;
   a support defining a support surface configured to support the piece of equipment;
   a first battery removably coupled to the chassis, wherein the first battery is interchangeable with a second battery; and
   a wireless charging interface coupled to the support and configured to wirelessly transfer energy from the first battery to the piece of equipment.

2. The delivery vehicle of claim 1, wherein the prime mover is an internal combustion engine, further comprising a generator coupled to the internal combustion engine and configured to supply electrical energy to at least one of the first battery or the wireless charging interface.

3. The delivery vehicle of claim 1, further comprising a connector configured to selectively electrically couple the first battery to a utility source of electrical energy to charge the first battery.

4. The delivery vehicle of claim 1, wherein the prime mover is an internal combustion engine, further comprising a generator coupled to the internal combustion engine and configured to supply electrical energy to the wireless charging interface.

5. The delivery vehicle of claim 1, wherein the first battery is configured to transfer the energy to the piece of equipment while the prime mover is driving the tractive element to propel the delivery vehicle and while the delivery vehicle is stationary.

6. The delivery vehicle of claim 1, wherein the wireless charging interface is a first wireless charging interface and the piece of equipment is a first piece of equipment, wherein the support is configured to support the first piece of equipment and a second piece of equipment, and wherein the delivery vehicle further comprises a second wireless charging interface coupled to the support and configured to wirelessly transfer energy to the second piece of equipment.

7. The delivery vehicle of claim 1, wherein the first wireless charging interface is longitudinally offset from the second wireless charging interface along a length of the support.

8. The delivery vehicle of claim 1, further comprising a trailer pivotally coupled to the chassis, wherein the trailer includes the support.

9. The delivery vehicle of claim 1, wherein the support is selectively repositionable between a first orientation in which the support is substantially horizontal and a second orientation in which the support is inclined to facilitate loading the piece of equipment onto the support.

10. A method of delivering a vehicle to a jobsite, the method comprising:

loading the vehicle onto a bed of a delivery truck;

securing the vehicle onto the bed in a position in which a first wireless charging interface of the delivery truck is in communication with a second wireless charging interface of the vehicle;

transferring energy from a first battery of the delivery truck to a second battery of the vehicle through the first wireless charging interface and the second wireless charging interface such that a temperature of the second battery is above a low temperature threshold or below a high temperature threshold; and reducing the transfer of energy to the second battery in response to the temperature of the second battery exceeding the high temperature threshold.

11. The method of claim 10, wherein transferring the energy includes transferring the energy from the first battery of the delivery truck to the second battery of the vehicle through the first wireless charging interface and the second wireless charging interface while the delivery truck is stationary.

12. The method of claim 10, wherein transferring the energy includes transferring the energy from the first battery of the delivery truck to the second battery of the vehicle through the first wireless charging interface and the second wireless charging interface while the delivery truck is in motion.

* * * * *